(12) United States Patent
Stefura et al.

(10) Patent No.: US 10,988,175 B2
(45) Date of Patent: Apr. 27, 2021

(54) DEVICE FOR ASSISTING THE ORIENTATION OF THE WHEELS OF A VEHICLE

(71) Applicant: VALEO VISION, Bobigny (FR)

(72) Inventors: Eric Stefura, Bobigny (FR); Thibaud Barillot, Bobigny (FR)

(73) Assignee: VALEO VISION, Bobigny (FR)

( * ) Notice: Subject to any disclaimer, the term of this patent is extended or adjusted under 35 U.S.C. 154(b) by 233 days.

(21) Appl. No.: 15/718,584

(22) Filed: Sep. 28, 2017

(65) Prior Publication Data

US 2018/0086380 A1 Mar. 29, 2018

(30) Foreign Application Priority Data

Sep. 28, 2016 (FR) ...................................... 16 59201

(51) Int. Cl.
*B62D 15/02* (2006.01)
*B60W 50/14* (2020.01)
*B60Q 9/00* (2006.01)

(52) U.S. Cl.
CPC ........... *B62D 15/029* (2013.01); *B60Q 9/008* (2013.01); *B60W 50/14* (2013.01); *B62D 15/027* (2013.01);
(Continued)

(58) Field of Classification Search
CPC ......... B60K 2350/928; B60W 2540/18; B62D 15/027; B62D 15/0275; B62D 15/02;
(Continued)

(56) References Cited

U.S. PATENT DOCUMENTS

| 6,539,303 | B2 * | 3/2003 | McClure | ............... | A01B 69/008 |
| | | | | | 180/204 |
| 2005/0171693 | A1 * | 8/2005 | Lange | .................. | G05D 1/0278 |
| | | | | | 701/23 |

(Continued)

FOREIGN PATENT DOCUMENTS

| DE | 103 46 691 A1 | 5/2005 |
| DE | 10 2012 004 502 A1 | 9/2013 |

(Continued)

OTHER PUBLICATIONS

French Preliminary Search Report dated May 18, 2017 in French Application 16 59201 filed on Sep. 28, 2016 (with English Translation of Categories of Cited Documents).

*Primary Examiner* — Mirza F Alam
(74) *Attorney, Agent, or Firm* — Oblon, McClelland, Maier & Neustadt, L.L.P.

(57) ABSTRACT

A device for assisting the driving of a motor vehicle, wherein it includes a processing unit configured to calculate the angular position of at least one wheel of the vehicle relative to a reference angular position and to generate a light signal representative of the angular position of said at least one wheel relative to the reference position. Also included is a method for assisting the driving of a motor vehicle equipped with such a device. The method includes a step of definition of the reference axis within the processing unit, a step of definition of the reference position within the processing unit, a step of calculation within the processing unit of the angular position of at least one wheel of the vehicle relative to the reference position, and a step of generation, inside the cab of the vehicle, of a light signal representative of the angular position of the at least one wheel relative to the reference position.

17 Claims, 3 Drawing Sheets

(52) U.S. Cl.
CPC .... *B62D 15/0275* (2013.01); *B60K 2370/782* (2019.05); *B60W 2050/146* (2013.01); *B60W 2540/18* (2013.01)

(58) Field of Classification Search
CPC .... B62D 15/028; B62D 5/0481; B62D 6/002; B62D 15/029; B60T 2201/10
See application file for complete search history.

(56) References Cited

U.S. PATENT DOCUMENTS

| | | | |
|---|---|---|---|
| 2006/0061464 A1* | 3/2006 | Okada | B60G 17/0195 340/459 |
| 2007/0235240 A1* | 10/2007 | Lauer | B62D 15/025 180/204 |
| 2008/0133087 A1* | 6/2008 | Klein | B62D 5/0481 701/41 |
| 2008/0211651 A1* | 9/2008 | Beutnagel-Buchner et al. | B62D 1/046 340/459 |
| 2010/0023221 A1* | 1/2010 | Klein | B62D 5/046 701/42 |
| 2011/0187518 A1* | 8/2011 | Strumolo | B62D 15/029 340/438 |
| 2014/0002638 A1* | 1/2014 | Cerruti | G01B 11/2755 348/135 |
| 2018/0374285 A1* | 12/2018 | Yu | B60C 23/0488 |

FOREIGN PATENT DOCUMENTS

| | | |
|---|---|---|
| EP | 1 927 529 A2 | 6/2008 |
| WO | WO 2014/155311 A1 | 10/2014 |

* cited by examiner

DEVICE FOR ASSISTING THE ORIENTATION OF THE WHEELS OF A VEHICLE

The present invention relates to the field of devices for assisting the driving of a motor vehicle.

During certain maneuvers, including for example parking maneuvers, it is important for the driver to know as precisely as possible the position of his vehicle relative to adjacent vehicles, or relative to various obstacles (curbs, posts delimiting parking spaces, etc.). To do this, certain known devices use cameras or other optical detectors configured to display, on a display screen situated inside the cab, an image of the elements situated in the detection field of these cameras and/or optical detectors. Some of these devices comprise image processing assemblies allowing display on the display screen of information representative of the trajectory of the vehicle relative to the obstacles concerned. Other devices, also known as "reversing radars", use detection means based on the principle of emission and reflection of ultrasonic waves in order to calculate the distance separating the vehicle concerned from various obstacles situated in its environment (other vehicles or items).

Such devices essentially function on the basis of calculating the distance separating the vehicle from the obstacle(s). During complex maneuvers, for example during parking or unparking maneuvers, the driver often needs to know as precisely as possible the actual angular position of the wheels of his vehicle relative to the vehicle itself and/or relative to one or more neighboring obstacles, and/or relative to an optimal trajectory for the maneuver he is to perform, in order to best anticipate the trajectory of the vehicle and the maneuvers he must perform.

The object of the present invention is to provide a new solution for assisting the driving of motor vehicles, in particular enabling the driver to know, at all moments and with precision, the angular position of his vehicle relative to a predefined direction and/or a given obstacle.

Another aim of the present invention is to facilitate the driving of a motor vehicle, and in particular to assist the driver in performing certain difficult maneuvers.

To this end, the object of the invention is a device for assisting the driving of a motor vehicle, comprising a processing unit configured to calculate the angular position of at least one of the vehicle's wheels relative to a predefined reference position. Preferably, the reference position is predefined by the processing unit.

It should be noted that said at least one wheel, the angular position of which is calculated relative to the reference position, is advantageously one of the steered wheels of the vehicle: in this text, reference will be made to "the wheel" as being the wheel or wheels of which the angular position is calculated by the processing unit relative to the reference position.

In order to define the reference position and calculate the angular position of the wheel relative to said reference position, the processing unit in particular comprises means for defining a reference axis and means for measuring the spatial orientation of the wheel. As a non-exclusive example, the processing unit of the device according to the invention may thus implement measuring means of the type of a set of sensors situated on the steering assembly of the vehicle, for example the steering column, and/or on the steering wheel of the vehicle, and in particular on a rim and/or central hub of said steering wheel. These may for example be angular encoders, optical sensors and in general any type of angular sensor. The processing unit may also collaborate with satellite location means. These may be satellite location means used for assisting the navigation of the vehicle, or other separate satellite location means. The processing unit for example comprises a microcontroller, a controller and/or a microprocessor.

According to a first embodiment and use of the invention, the reference position is defined as being the position of alignment of said at least one wheel of the vehicle with the reference axis. In other words, in this first embodiment, the reference position is defined by the reference axis of the vehicle. In the case where the reference axis is a longitudinal axis of the vehicle running from rear to front of said vehicle, this advantageous configuration allows the definition of the angular position of the wheels relative to this vehicle axis. According to an alternative embodiment, this reference position is defined as the position of alignment of said at least one wheel with a reference direction forming a predefined angle—preferably not zero—with the reference axis. In other words, in the second embodiment, the reference position is defined by a reference direction which is angularly separate from the reference axis of the vehicle, the reference direction thus forming a secondary reference axis which is inclined relative to the reference axis. In the case where the reference axis corresponds to the longitudinal axis of the vehicle, this advantageous configuration allows definition of the angular position of the wheels relative to another reference axis, which may for example be defined by the driver. This advantageous configuration also allows definition of the angular position of the wheels with a certain angular offset relative to the reference axis, the angular offset being defined by the angle between the reference direction and the reference axis.

According to various embodiments of the invention, the reference axis may be one of the extension directions of the vehicle: for example, the longitudinal axis or the transverse axis of said vehicle. In some cases, the reference axis may extend in a combined direction between the longitudinal axis and the transverse axis of the vehicle.

According to a particular embodiment of the invention, the processing unit is configured to communicate with a dialog interface arranged to allow the driver himself to select the reference axis. In other words, the reference position is defined by the processing unit on the basis of information supplied by the driver of the vehicle via the dialog interface. This may for example be a tactile interface situated at the driver's station, on which the driver may view his vehicle and his immediate environment. The information provided by the driver may for example be an angle he wishes to define between the wheels of his vehicle and the reference axis, the axis obtained in this angular position forming the reference direction.

Advantageously, the device according to the invention comprises an obstacle detection system. It should be noted here that the term "obstacle" must be understood in the widest sense: this may be one or more other parked vehicles, close to which the vehicle equipped with the device according to the invention should be positioned or parked; it may be street furniture elements relative to which the vehicle equipped with the device according to the invention must be positioned, such as for example a pavement edge; or it may also be the road itself. In general, in the following paragraphs of the present description, the term "obstacle" refers to a neighboring element situated close to the vehicle equipped with the driving assistance device according to the invention, and relative to which environment said vehicle must be positioned and/or moved. This positioning and/or movement in said environment requires the configuration of the vehicle with at least one specific angular orientation of at least one of its wheels. In the context of the present invention, preferably—but not exclusively—the neighboring element relative to which the vehicle is performing the maneuver is immobile during this maneuver.

According to various embodiments, the obstacle detection system comprises one or more optical sensors, such as optical position sensors, arranged to measure at least one distance between a part of the vehicle and the obstacle, at least one camera for measuring at least part of the environment situated close to the vehicle, and/or one or more ultrasonic sensors. The obstacle detection system also collaborates with the satellite detection and location means, either the same satellite location means as those used elsewhere by the processing unit, or satellite detection and location means separate from those used by the processing unit to calculate the angular position of the wheel relative to the reference position.

According to a particular embodiment of the invention, the processing unit is configured to define the reference axis as being an axis of extension of the obstacle detected by the detection system. Such an embodiment may for example be particularly advantageous when the vehicle must be positioned and/or moved along a pavement edge which is not straight, or along a straight pavement edge which is oblique relative to the road. The reference axis allowing definition of the reference position may then advantageously be selected, according to various embodiments of the invention, as being congruent with the straight pavement edge or as being a tangent to such a non-straight pavement edge. Also, according to various embodiments of the invention, this reference axis may be defined by the processing unit on the basis of information it receives from the detection system and from its own location means, or from the driver himself via said dialog interface. In the latter case, the driver may for example himself define the reference axis relative to which he wishes the wheel axes to be referenced.

According to the invention, the processing unit is also configured to generate, inside the cab of the vehicle, a signal representative of the angular position of said at least one wheel relative to the reference position previously defined.

Advantageously, this signal is of the type of at least one light signal. According to a particularly advantageous embodiment of the invention, this light signal is visible on the vehicle steering wheel, either emitted via at least one light source situated on said steering wheel or projected thereon by suitable projection means, for example situated in the roof of the vehicle cab. As a non-limitative example, such a light signal may be generated on a rim of the steering wheel and/or on a central hub of said steering wheel. In this case, in order to make its interpretation by the driver as intuitive as possible, this light signal is advantageously generated in an angular region—in particular of the steering wheel—representative of the angular position of the wheel relative to the reference position. For example, if the wheel concerned is oriented at a positive angle in the trigonometric sense relative to the reference position defined by the processing unit, the light signal will be generated in the second angular quadrant of the steering wheel, i.e. to the left of the vertical median axis of the steering wheel, and above the horizontal median axis passing through the hub of the steering wheel and perpendicular to the vertical median axis. Preferably, the light signal is emitted by a plurality of LED-type light sources situated on the central hub and/or the rim of the steering wheel. In particular, the hub and/or the rim of the steering wheel may comprise a plurality of light sources aligned according to an angular sector. As a function of the angular position of the at least one wheel relative to the reference position, the light sources are illuminated and/or extinguished successively in order to represent an illuminated or extinguished angular sector which is representative of said angular position. More generally, the angular position may be represented by modulation of the light intensity of the light sources. Alternatively or additionally, the angular position may be represented by a modulation of the color of the light sources.

Also advantageously, this light signal comprises a first part representative of the reference position, and a second part representative of the angular position of said at least one wheel relative to said reference position. The driver thus at all times has access to a comparison element of rapid and intuitive interpretation, in order to guide him in his maneuvers. The first part and the second part of the light signal may be obtained by setting different parameters of the light sources representing said first and second parts. As a non-limitative example, the different parameter settings may concern the intensity and/or color of the light signal emitted by the light sources.

According to another embodiment, the light signal is visible from a region of the cab situated in the driver's field of vision when the latter performs the proposed maneuver. Thus, as non-limitative examples, this light signal may be visible in the substantially central position of the driver's station facing the driver, and/or it may be projected onto a zone of the windscreen by means of a system such as those known as "head-up display". Where applicable or additionally, the light signal is visible over at least part of the rear window of the vehicle, in order to facilitate maneuvering of the vehicle when the driver is reversing said vehicle.

In combination or additionally, according to another advantageous characteristic of the invention, the color of the light signal varies as a function of the angular position of the wheel relative to the reference position: to this end, the means for generating the light signal may for example comprise a set of colored light-emitting diodes from the range known as RGB (an acronym for Red, Green, Blue, referring to light-emitting diodes emitting light which is respectively red, green and blue). Also, one or more LEDs of different colors could be provided, in some cases white LEDs, or any other type of light source which allows the color of the light source to be varied as a function of the angular position of the wheel. It could then be considered for the signal emitted to be of a first color for a first predefined range of values of the angular position of the wheel concerned relative to the reference position, and for the signal to be of a second color for a second predefined range of values of angular position of the wheel concerned relative to the reference position. In general, at least one visual parameter of the light signal varies as a function of the angular offset between the at least one wheel and the reference position. As non-limitative examples, the visual parameter of the light signal may be of the light intensity and/or color type. The angular offset may be subdivided into a plurality of ranges inside which the at least one visual parameter of the light signal is modified.

As an example, the light signal may assume a first color when the angular offset between the at least one wheel and the reference position lies in a first range of values, and a second color when the angular offset between said at least one wheel and the reference position lies in a second range of values.

According to a particular embodiment of the invention, the processing unit is configured to calculate the angular position of the obstacle relative to the above-mentioned reference position, and to deduce therefrom a relative angular orientation of the obstacle and of the vehicle wheel relative to this reference position. According to this particular embodiment, the processing unit is then advantageously configured to generate, inside the cab of the vehicle, a light signal representative of the orientation of the obstacle and vehicle relative to the reference position.

Thus, according to different variants embodiments of the invention:
- the light signal represents the difference between the relative position of the wheel and the obstacle, and the reference position,
- the light signal represents the difference between the relative position of the wheel and the obstacle, and the angular position of the obstacle.

The invention also extends to a method of assisting the driving of a vehicle equipped with a driving assistance device according to the invention as has just been described.

Such a driving assistance method advantageously comprises at least the following steps:
- a first step of definition of a reference axis by the processing unit itself or by the driver via a dialog interface configured to communicate with the processing unit,
- a second step of definition of the reference position by the processing unit. The reference position may alternatively be selected in particular from a direction aligned with the reference position, or a direction forming with this reference axis an angle predefined by the processing unit or by the driver via said dialog interface,
- a third step of calculation of the angular position of at least one wheel—advantageously a steered wheel—relative to the reference position thus defined,
- a fourth step of generation, inside the cab of the vehicle, of a light signal representative of the angular position of the at least one wheel relative to this reference position.

Such a method is particularly advantageously applied when the vehicle equipped with the device according to the invention is parked, and when the driver wishes for example to straighten the wheels in order to align them with the longitudinal axis of the vehicle, or conversely when the vehicle is parked on a sloping and/or damaged terrain and as an additional precautionary measure, the driver wishes to turn the wheels into a secure position which is different from the position aligned with the longitudinal axis of the vehicle. This secure position may in some cases be proposed by the vehicle via the processing unit, or be predefined by the driver via a graphic interface.

According to an advantageous variant, the method according to the invention comprises a step of detecting at least one obstacle, prior to the first step. The obstacle is for example a pavement edge or the road itself, an obstacle relative to which the driver wishes to align the wheels of his vehicle. As has been indicated above, the reference axis may then be defined by the processing unit in an extension direction of this obstacle (direction of the pavement edge, or direction of the road axis).

In this case, the light signal generated during the fourth step may also be representative of the angular position of the obstacle relative to said reference position.

Finally, according to yet another variant of the method according to the invention, the angular position of the obstacle relative to the reference position may be calculated by the processing unit, which may then deduce therefrom a relative orientation of the vehicle wheel and of said obstacle relative to the reference position. This step of calculation is preferably performed between the third and the fourth steps. Then the relative positions of the at least one wheel and of the obstacle relative to the reference position may be deduced by the processing unit; the light signal generated is also representative of the angular differences between said at least one wheel and the obstacle relative to said reference position.

According to another aspect of the invention, a vehicle is proposed which is equipped with the driving assistance device according to the invention and/or implements the driving assistance method according to the invention.

Further characteristics and advantages of the present invention will appear more clearly from reading the description below and from the drawings in which.

It should first be noted that, although the figures present the invention in detail in order to allow its implementation, they may naturally serve to better define the invention where applicable. It should also be noted that, in all figures, similar elements and/or those fulfilling the same function are indicated by the same reference. Finally, on all figures, the vehicle 1 equipped with a device according to the invention is drawn diagrammatically as viewed from above: the longitudinal direction is indicated by the direction of the axis (Ox) of an orthonormal reference system illustrated on the figures, and its transverse direction is represented by the direction of the axis (Oy) of the same orthonormal reference system.

Figure 1:
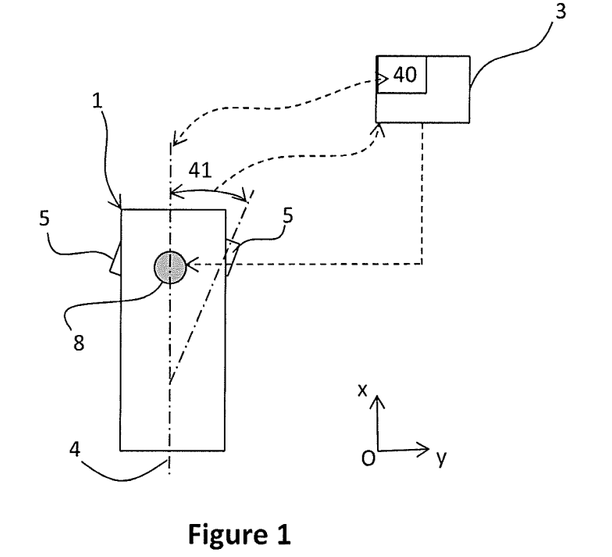
FIG. 1 illustrates diagrammatically the function of the device according to the invention in a first mode of defining the reference position.
Figure 2:
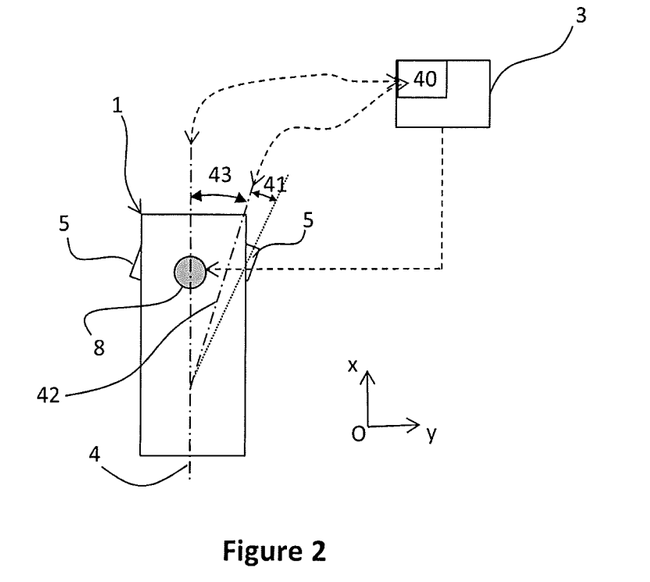
FIG. 2 illustrates diagrammatically the function of the device according to the invention in a second mode of defining the reference position.

With reference to FIGS. 1 and 2, the device according to the invention comprises a processing unit 3 configured to define a reference position 40 of at least one wheel 5 of the vehicle 1, and to calculate the angular position of this wheel 5 relative to the reference position 40. According to the invention, the processing unit 3 is also configured to generate, inside the cab of the vehicle 1, a signal 8 representative of the angular position of said at least one wheel 5 relative to the reference position 40.

More precisely, the processing unit 3 is configured to define a reference axis 4, from which the processing unit 3 defines the reference position 40. With reference to FIGS. 1 and 2, the reference axis 4 is defined as being congruent with the longitudinal extension axis (Ox) of the vehicle 1.

According to the embodiment illustrated by FIG. 1, the reference position 40 is defined by the position of the reference axis 4. In other words, the reference position 40 of at least one of the wheels 5 is here defined when said at least one wheel is parallel with the reference axis 4. According to this embodiment, the processing unit 3 is configured to calculate the angle 41 existing between the wheel 5 and the reference axis 4, and to generate, inside the cab of the vehicle 1, a signal 8 representative of the value of this angle 41. These various operations require the processing unit 3 to comprise means of recognition of the angular position of the wheel 5 relative to the vehicle: these means of recognition of the angular position of the wheel may, as non-exhaustive examples, include one or more sensors placed on the steering assembly of the wheel 1 or on the steering wheel thereof. Alternatively or additionally, the obstacle detection system includes and/or uses satellite location means.

According to the embodiment illustrated by FIG. 2, the reference position 40 is defined by the direction of a straight line 42 which forms a predefined angle 43 with the reference axis 4. The reference position 40 of the wheel 5 is then in this case obtained when said at least one wheel is parallel with the direction of the straight line 42. One particularly advantageous application example of such a choice of reference position is the case of parking the vehicle 1 on a road which slopes in the longitudinal direction (Ox) of said vehicle 1. The driver may then, as a supplementary precautionary measure, wish to orient his wheels 5 at an angle 43 relative to the direction of the greatest slope. In this case, the device according to the invention advantageously comprises a dialog interface 7 (not shown in the figures) which is configured to communicate with the processing unit 3 and via which the driver himself can define the value of angle 43.

Whatever the mode of defining the reference position 40, the processing unit 3 is configured to generate, inside the cab of the vehicle 1, a signal 8 representative of the angular position 41 of at least one of the wheels 5 relative to the reference position 40. According to a preferred embodiment of the invention, the signal 8 is a light signal. Advantageously, this light signal 8 is visible in a region of the cab situated in the driver's field of vision when the latter is performing his maneuver. According to a preferred embodiment of the invention, the light signal 8 is visible on the steering wheel 9 of the vehicle 1. According to alternative embodiments, it may for example be visible on a substantially central region of the dashboard facing the driver, or may be projected onto the windscreen of the vehicle 1 via a system such as that known as "head-up display". According to various embodiments of the invention, the light signal 8 may be emitted in or projected into the region in which it is visible.

Figure 3A:
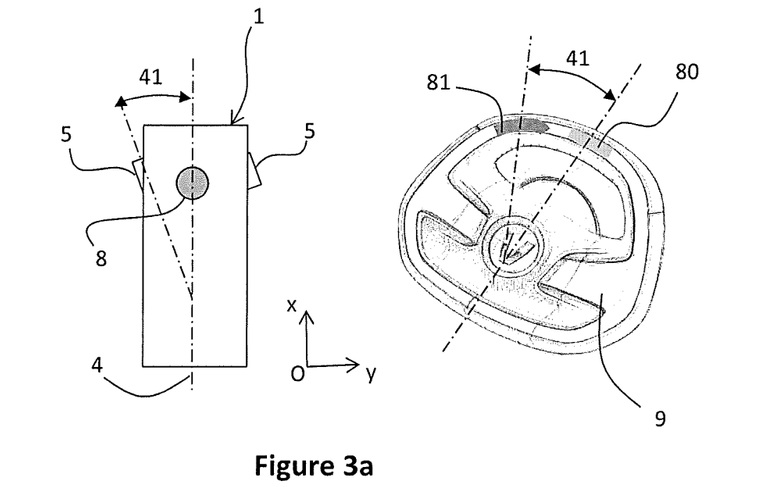
FIGS. 3*a* and 3*b* illustrate an embodiment of the invention in which the reference axis is selected on the vehicle, and various possibilities for displaying the light signal on the steering wheel of this vehicle as a function of the selected mode of defining the reference position.
Figure 3B:
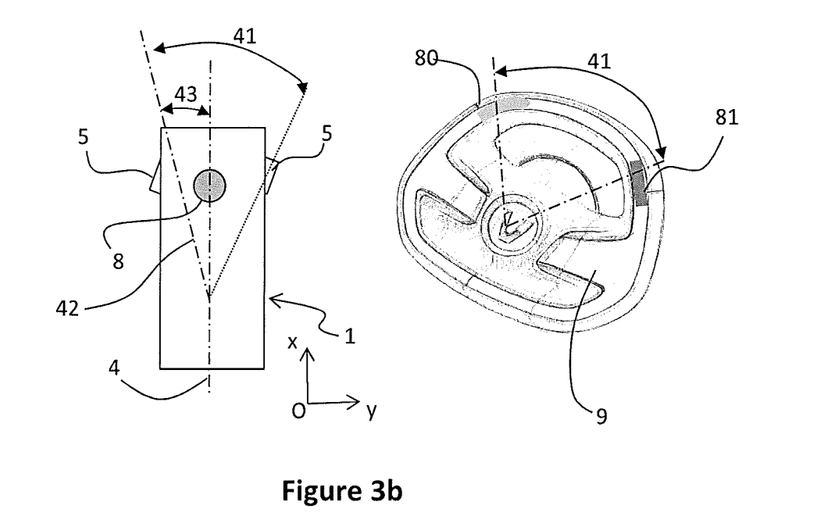

FIGS. 3a and 3b illustrate various possible configurations of the light signal 8 as a function of the angular position 41 of at least one wheel 5. The example illustrated by FIG. 3a is that of an embodiment in which the reference position 40 is defined by the alignment of at least one of the wheels 5 on the reference axis 4, here defined as the longitudinal axis (Ox) of the vehicle 1. The light signal 8 is here visible on the steering wheel 9 and assumes different colors depending on the value of the angular position 41 of the wheel 5 relative to the reference position 40. If desired, another parameter of the light signal could be modified as a function of the angular position of the wheel relative to the reference position, such as for example a light intensity.

In the example illustrated by FIG. 3a, when the wheel 5 is aligned with the reference axis 4, i.e. here when the wheel 5 is aligned with the longitudinal direction (Ox) of the vehicle 1, the light signal assumes a first, arbitrarily defined color 80. For example, this color could be green to indicate that the angular position of the wheel 5 lies within a range of values considered correct relative to the reference position 40. Conversely, when the wheel 5 forms an angle 41 not equal to zero with the reference position 40, the light signal assumes a second color 81, different from the first color 80. For example, this color could be red to indicate that the angular position of the wheel 5 lies in a range of values too far remote from the values considered correct relative to the reference position 40. To generate these different colors, the processing unit 3 advantageously comprises for example a set of light-emitting diodes of the LED type.

According to the embodiment illustrated by FIGS. 3a and 3b, the angular position of the light signal 8 on the steering wheel 9 also varies as a function of the angular position of the wheel 5 relative to the reference position 40. According to a first variant, the light signal 8 may thus be displayed at an angular position on the steering wheel which is substantially equal to the value of the angle 41 between the wheel 5 and the reference position 40. According to another variant, the light signal 8 may simply be displayed on the steering wheel 9 in a quadrant which, for the driver, represents the direction in which he must turn the wheel 5 in order to reach the reference position 40. In this sense, according to an advantageous embodiment, the light signal 8 comprises a first component which is preferably fixed on the steering wheel 9 and represents a reference position 40, and a second component, the display location of which varies on the steering wheel 9 and which represents the angular position of the wheel 5 relative to the reference position 40.

In the example illustrated by FIG. 3b, the reference axis 4, as in the example illustrated by FIG. 3a, is congruent with the longitudinal axis (Ox) of the vehicle 1, but the reference position 40 is here represented by direction 42 forming an angle 43 with the reference axis 4. The light signal indicating that the angular position of the wheel 5 relative to the reference position 40 lies in a range of values considered correct, is then visible on the steering wheel 9 in an angular position representative of the difference between the reference axis and the reference position 40.

The examples illustrated by FIGS. 3a and 3b correspond for example to the case of a vehicle 1 being parked, the driver of which wishes to arrange the wheels 5 in a predefined angular position relative to the vehicle 1 itself: vehicle being parked, the driver of which wishes to straighten the wheels to align them with the longitudinal axis of the vehicle; or vehicle being parked, the driver of which conversely wishes to orient the wheels according to a predefined angle relative to the longitudinal axis of said vehicle.

Alternatively or additionally, the light signal is displayed on an immovable part of the steering wheel, such as the hub for example, and/or on the dashboard and/or a part of the windscreen and/or the head-up display device. The light signal then advantageously represents the angle defined between the position of the wheels 5 relative to the reference axis. In particular, when the light signal takes the form of a straight light strip, a longitudinal direction of said strip is configured to represent the angular position of the wheels relative to the reference axis: when the wheels are turned relative to this reference axis, the longitudinal dimension of the strip is modified so as to represent the angular variation of the wheels relative to the reference axis. Alternatively, when the light signal takes the form of a light strip in the form of an angular sector, a radial dimension of said angular sector is configured to represent the angular position of the wheels relative to the reference axis: when the wheels are turned relative to this reference axis, the dimension of the angular sector is modified so as to represent the angular variation of the wheels relative to the reference axis.

Figure 4:
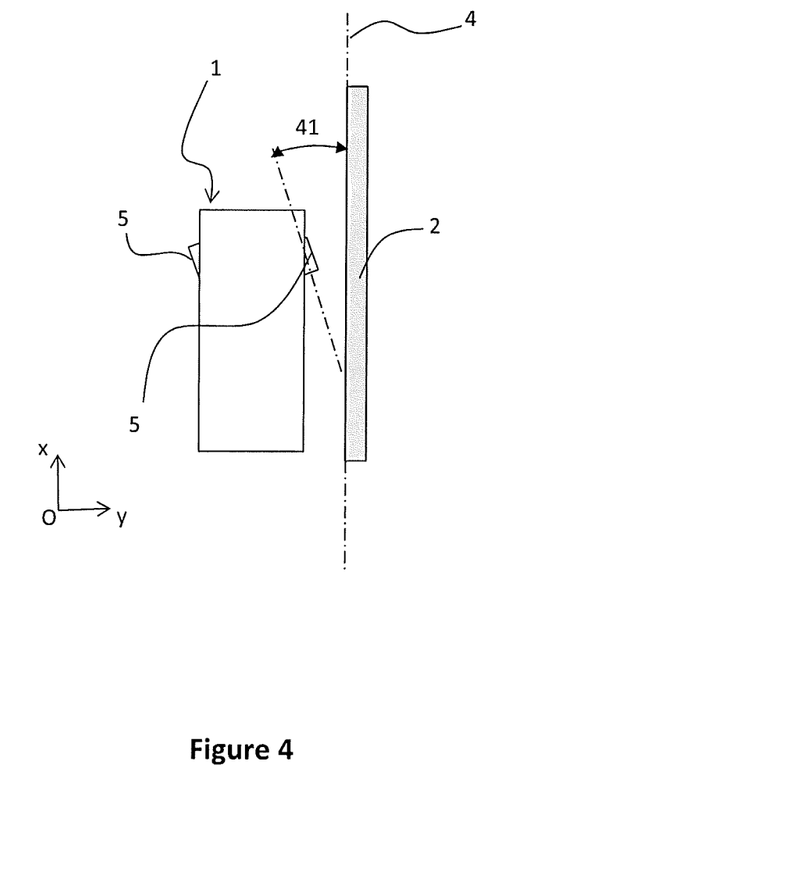
FIG. 4 illustrates an embodiment of the invention in which the reference position is defined relative to an obstacle detected by the device according to the invention.

FIG. 4 illustrates an embodiment of the invention in which the aim is to angularly position at least one of the wheels 5 of the vehicle 1 relative to a fixed element of the environment of said vehicle 1, for example a pavement edge. The element of the environment is here considered as obstacle 2 relative to which the vehicle 1 must move and position at least one of its wheels 5 in a reference position 40. In this case, the device according to the invention advantageously comprises an obstacle detection system, for example a system using one or more optical sensors. In this case also, the processing unit 3 is advantageously configured to define the reference axis 4 as a direction characteristic of the obstacle 2. In the example illustrated on FIG. 4, in which the obstacle 2 is a substantially straight pavement edge, the reference axis 4 is thus defined as being congruent with the extension direction of this pavement edge 2. In the case where the obstacle 2 is a curved pavement edge, the reference axis 4 could be defined as the tangent to the curve of this pavement edge 2 in the region in which the vehicle 1 must be positioned against said pavement edge.

The processing unit 3 is then configured to define the reference position 40 from the reference axis 4 selected on an external element of the vehicle. To this end, the processing unit 3 advantageously comprises means of locating the obstacle 2, for example satellite location means such as those used elsewhere to assist with navigation of the vehicle. The generation of the light signal 8 and the modes of display of this light signal 8 representative of the angular position of at least one wheel 5 relative to the reference position 40 are then similar to those described above for the exemplary embodiments illustrated on FIGS. 3a and 3b.

The invention thus allows the driver of a vehicle 1 to obtain, rapidly and intuitively, information on the angular position of one or more wheels of his vehicle relative to the vehicle itself or relative to an obstacle outside the vehicle. The driving situations in which the invention is intuitively preferably applied are evidently those of parking assistance.

Thus, as has been mentioned above, when the vehicle is to be parked, the driver may orient the wheels in a predefined direction. But the invention may also be applied particularly usefully during the actual parking maneuvers. In fact, in the case of a vehicle 1 being parked along an obstacle 2, a characteristic direction of which is selected as the reference axis 4 in order to define the reference position 40, the driver has valuable information guiding him in the various maneuvers.

Thus, as has been mentioned above, the invention also extends to various methods for assisting the parking of a vehicle 1 equipped with a device according to the invention.

A first variant of such a method mainly relates to the case in which the reference position 40 is defined relative to the vehicle itself, i.e. the case in which the reference axis 4 is selected on the vehicle 1 itself. In this case, the method according to the invention mainly comprises:
  a first step of defining the reference axis 4: the reference axis 4 may be predefined by the manufacturer within the processing unit, or may be defined by the driver himself via a dialog interface 7 which is configured to communicate with the processing unit 3.
  a second step of defining the reference position 40 inside the processing unit 3: here again, one or more reference positions may be predefined by the manufacturer and selected by the driver by means of the dialog interface 7, or the reference position 40 may be defined directly by the driver himself via this same dialog interface 7 which is configured to communicate with the processing unit 3.
  a third step of calculation, by the processing unit 3, of the angular position 41 of at least one of the wheels 5 of the vehicle 1 relative to the reference position 40: in this step, the processing unit 3 receives, for example, information on the angular position of the wheel 5 via appropriate sensors placed on the steering assembly and/or on the steering wheel of the vehicle, or receives this information for example via satellite location means with which it is equipped.
  a fourth step of generating, inside the cab of the vehicle 1, the light signal 8 representative of the angular position 41 of the wheel 5 relative to the reference position 40: the various configurations of this light signal described above may be implemented according to different versions of the method.

Such a method which comprises a reduced number of steps is simple to implement on a vehicle already equipped with one or more processing and control units, as is the case with the majority of modern vehicles.

In another variant of such a method, which relates mainly to the case where the reference position 40 is defined relative to an obstacle 2 detected in the environment of the vehicle, the method according to the invention, in addition to the four steps mentioned above, comprises a prior step of detection of the obstacle 2. It may also comprise a possible step of calculating, within the processing unit 3, the angular position of the obstacle 2 relative to the reference position 40, and a step of deducing the angular position of the wheel 5 and obstacle 2 relative to the reference position 40. In this case, the light signal 8 generated is advantageously representative of this position of the wheel 5 and obstacle 2 relative to the reference position 40. Such a method may be usefully applied, for example, in the case where the driver of the vehicle wishes to place the wheels at a predefined angle relative to an obstacle during a parking operation.

The method according to the invention may thus provide a simple and effective assistance to the driver during various maneuvers.

The invention is not however limited to the means and configurations described and illustrated, and is also applicable to all equivalent means or configurations and to any combination of such means. Thus, although the invention and the methods it covers have mainly been described in the context of an application to parking, it is evident that it is not limited to such applications.

The invention claimed is:

1. A driving assistance device for a motor vehicle, the driving assistance device comprising:
  at least one processing circuitry configured to:
    calculate an angular position of at least one wheel of the motor vehicle relative to a reference position, and
    generate a light signal representative of the angular position of the at least one wheel relative to the reference position, wherein the light signal is visible on a steering wheel of the motor vehicle, the light signal including (i) a first component representing the reference position and (ii) a second component representing the angular position of the at least one wheel of the motor vehicle relative to the reference position.

2. The driving assistance device according to claim 1, wherein the reference position is defined by an alignment of the at least one wheel with a reference axis.

3. The driving assistance device according to claim 2, wherein the reference position is defined by the alignment of the at least one wheel with a reference direction forming a predefined angle with the reference axis.

4. The driving assistance device according to claim 2, wherein the reference axis is defined by the processing circuitry as being one of extension directions of the motor vehicle.

5. The driving assistance device according to claim 2, comprising a system for detecting an obstacle.

6. The driving assistance device according to claim 5, wherein the reference axis is defined by the processing circuitry as being a direction characteristic of the obstacle.

7. The driving assistance device according to claim 1, wherein the reference position is defined by the processing circuitry based on information communicated by a driver of the motor vehicle via a dialog interface.

8. The driving assistance device according to claim 1, wherein the light signal is placed angularly in a region representative of a direction of an angular offset between the at least one wheel and the reference position.

9. The driving assistance device according to claim 8, wherein the light signal assumes a first color when the angular offset between the at least one wheel and the reference position lies within a first range of values, and a second color when the angular offset between the at least one wheel and the reference position lies within a second range of values.

10. A method for driving of the motor vehicle equipped with the driving assistance device according to claim 2, the method comprising:
    defining the reference axis by the processing circuitry;
    defining the reference position by the processing circuitry;
    calculating, by the processing circuitry, the angular position of the at least one wheel relative to the reference position; and
    generating, inside a cab of the motor vehicle, the light signal representative of the angular position of the at least one wheel relative to the reference position.

11. The method according to claim 10, further comprises detecting an obstacle prior defining the reference axis, wherein the light signal is also representative of an angular position of the obstacle relative to the reference position.

12. The method according to claim 11, further comprising:
    calculating, by the processing circuitry, the angular position of the obstacle relative to the reference position; and
    deducing relative positions of the at least one wheel and the obstacle relative to the reference position, wherein the light signal is representative of angular differences between the at least one wheel and the obstacle relative to the reference position.

13. The motor vehicle equipped with the driving assistance device according to claim 1.

14. The method according to claim 10, wherein the reference axis is defined by the processing circuitry as being one of extension directions of the motor vehicle.

15. The method according to claim 10, further comprises detecting an obstacle by a system.

16. The method according to claim 10, wherein the reference position is defined by the processing circuitry based on information communicated by a driver of the motor vehicle via a dialog interface.

17. The method according claim 10, further comprises visibly displaying the light signal on the steering wheel of the motor vehicle.

* * * * *